US012726893B2

(12) United States Patent
Potharaju et al.

(10) Patent No.: US 12,726,893 B2
(45) Date of Patent: Sep. 1, 2026

(54) 5G TO WI-FI NETWORK SLICE MAPPING

(71) Applicant: Cisco Technology, Inc., San Jose, CA (US)

(72) Inventors: Shailender Potharaju, Fremont, CA (US); Srinath Gundavelli, San Jose, CA (US); Brian D. Hart, Sunnyvale, CA (US); Timothy P. Stammers, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 600 days.

(21) Appl. No.: 18/295,687

(22) Filed: Apr. 4, 2023

(65) Prior Publication Data

US 2024/0340781 A1 Oct. 10, 2024

(51) Int. Cl.

*H04M 3/42* (2006.01)
*H04W 48/02* (2009.01)
*H04W 48/08* (2009.01)
*H04W 48/18* (2009.01)
*H04W 84/12* (2009.01)

(52) U.S. Cl.

CPC ........... *H04W 48/18* (2013.01); *H04W 48/02* (2013.01); *H04W 48/08* (2013.01); *H04W 84/12* (2013.01)

(58) Field of Classification Search

CPC ..... H04W 48/18; H04W 48/02; H04W 48/08; H04W 84/12; H04W 84/042
USPC ........................................................ 455/414.1
See application file for complete search history.

(56) References Cited

U.S. PATENT DOCUMENTS

2017/0164212 A1* 6/2017 Opsenica ................ G06F 16/41
2019/0132259 A1 5/2019 Kim
2021/0075678 A1 3/2021 Seetharaman et al.
2022/0210012 A1 6/2022 Stockert et al.
2022/0210722 A1 6/2022 Saini et al.
2023/0014639 A1 1/2023 Pocha et al.
2023/0232241 A1* 7/2023 Jiang .................... H04W 16/10 370/254

* cited by examiner

*Primary Examiner* — Temica M Beamer
(74) *Attorney, Agent, or Firm* — Patterson + Sheridan, LLP

(57) ABSTRACT

Embodiments herein describe techniques for mapping cellular slices to a Wi-Fi Network. It may be advantageous to port the slice constructs from a cellular network (e.g., 5G) to the Wi-Fi system. In one embodiment, templates are established for each slice which define different parameters that are used when the slice is implemented on a cellular network and a Wi-Fi network. A service provider can establish a template for each slice. In one embodiment, the template includes parameters for each slice for both cellular and Wi-Fi networks.

20 Claims, 6 Drawing Sheets

5G TO WI-FI NETWORK SLICE MAPPING

TECHNICAL FIELD

Embodiments presented in this disclosure generally relate to mapping 5G slices to a Wi-Fi network.

BACKGROUND

Network slicing is one of the key concepts in the 3GPP 5G system architecture. A network slice is a logical end-to-end service construct. It characterizes a certain network behavior, realizing performance and segmentation in the radio and core network. A given client may have access to multiple slices advertised by the access network. Based on the nature of the application and policy, the client activates services on a specific slice and binds the application to that service.

In 3GPP system, the network slice is identified by Single-Network Slice Selection Assistance Information (S-NSSAI). An S-NSSAI is comprised of SST (Slice Type) and SD (Slice Differentiator). A typical property set of a slice includes, UL (uplink)-DL (downlink)-Throughput-Per-Slice, Maximum Supported Packet Size, Number of Connections (User Equipment (UEs)/Flows), Isolation Level (thread, process, physical memory, physical network, logical network, function isolation), Local Breakout, Geographic Coverage, and Assurance Reporting. 3GPP also supports pre-defined slice types such as enhanced mobile broadband (eMBB), Ultra-reliable low latency communication (URLLC), massive internet of things (mIOT), and vehicle to everything (V2X), as well as vendor specific slices.

With the goal to characterize a Network Slice and to bring a consistent meaning across mobile operators, Global System for Mobile Associate (GSMA) has defined Generic Slice Template (GST). GST is a set of common slice attributes. By filling the GST with values for all or a subset of the attributes, easily realizable slices can be described. A GST filled with values is called the Network Slice Type (NEST).

While many cellular carriers also support public Wi-Fi services, currently 5G slices cannot easily be integrated with Wi-Fi networks.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
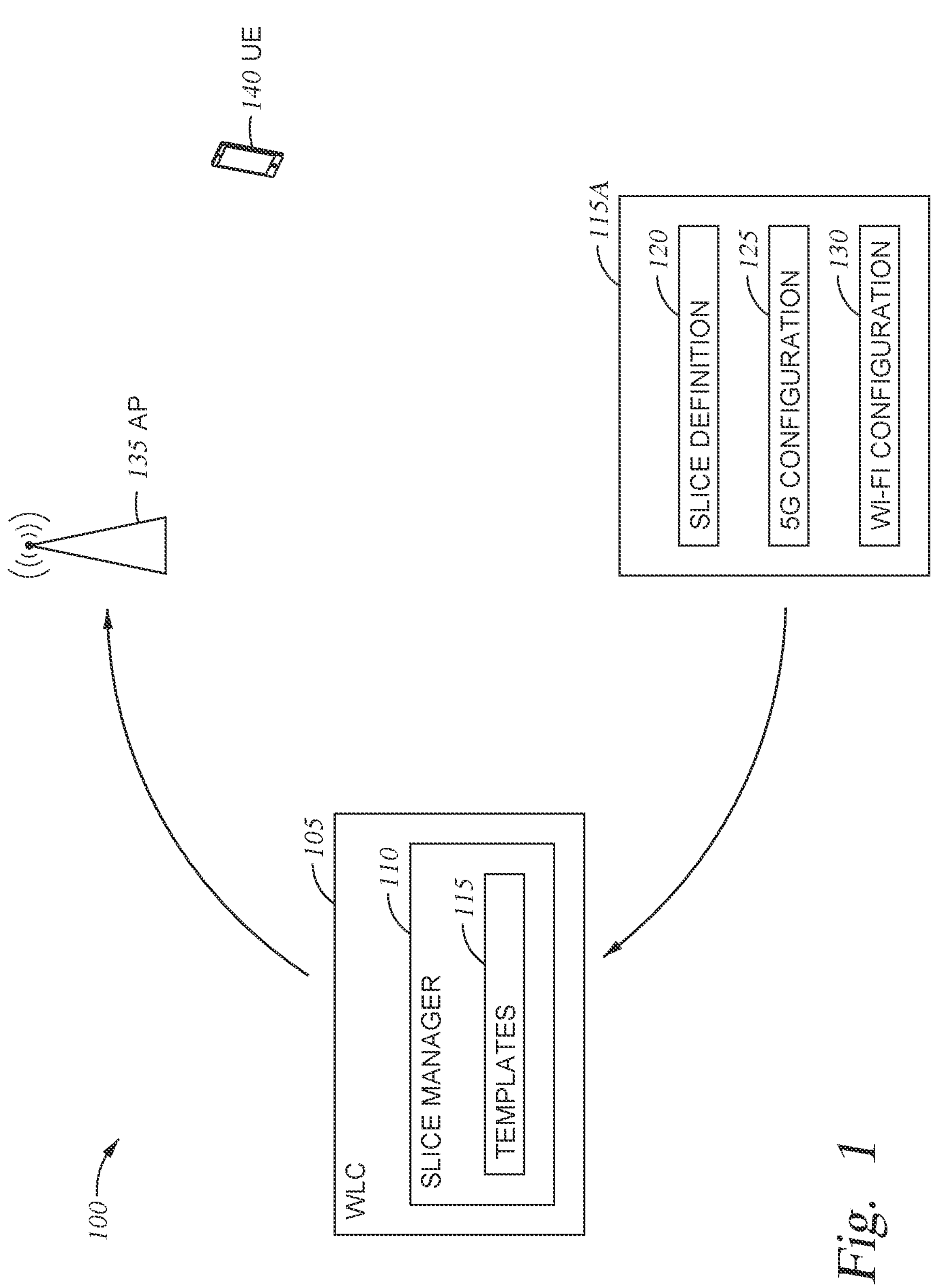
FIG. 1 illustrates a Wi-Fi network that supports 5G slices, according to one embodiment.

One embodiment presented in this disclosure is a method that includes providing a plurality of templates for a plurality of different types of network slices, where each of the plurality of templates includes a first set of parameters for establishing a respective slice in a cellular network and a second set of parameters for establishing the respective slice in a Wi-Fi network, configuring an access point (AP) to support the second set of parameters in the plurality of templates, and advertising the network slices to user equipments (UEs) (e.g., a client device) using the AP.

Another embodiment presented in this disclosure is a system that includes an AP and a wireless local access network (LAN) controller (WLC). The WLC is configured to provide a plurality of templates for a plurality of different types of network slices where each of the plurality of templates includes a first set of parameters for establishing a respective slice in a cellular network and a second set of parameters for establishing the respective slice in a Wi-Fi network and configure an access point (AP) to support the second set of parameters in the plurality of templates. The AP is configured to advertise the network slices to UEs.

Another embodiment presented in this disclosure is a WLC having a processor and a memory storing a program which, when executed by the processor, performs an operation. The operation includes providing a plurality of templates for a plurality of different types of network slices where each of the plurality of templates includes a first set of parameters for establishing a respective slice in a cellular network and a second set of parameters for establishing the respective slice in a Wi-Fi network and configuring an access point (AP) to support the second set of parameters in the plurality of templates where the AP is configured to advertise the network slices to UEs.

EXAMPLE EMBODIMENTS

Embodiments herein describe techniques for mapping 5G slices to a Wi-Fi network. It may be advantageous to port the slice constructs from 5G to the Wi-Fi system. For example, private 5G (P5G) has come (or soon will come) into enterprise environments and will co-exist with Wi-Fi. It is anticipated that Wi-Fi and P5G systems will co-exist with much lighter interworking and without client's Wi-Fi traffic using the data plane functionality of a 3GPP core network. The interworking will likely be at the policy level and ensure the application receives consistent treatment when moving between the networks. This relies on the Wi-Fi system providing the same service constructs as in a 5G system.

In one embodiment, templates are established for each slice which define different parameters that are used when the slice is implemented on a 5G network and a Wi-Fi network. A service provider can establish a template for each slice (e.g., a MMTC slice for battery operated IoT devices, a URLLC slice for devices that demand low latency and deterministic scheduling, or an eMBB slice for voice, video, and data transfer). In one embodiment, the template includes parameters for each slice for both 5G and Wi-Fi networks.

The embodiments herein describe techniques to realize a 5G equivalent slice in Wi-Fi for standard, and custom, slice types.

The embodiments herein allow characterization of a slice for the capability and service offered. A client can attach to the Wi-Fi network and request access to a certain slice. The application policy in the client identifies the slice that the UE requests to use for that application. A UE may initially be attached to P5G network and may be accessing a specific slice, before it enters the Wi-Fi domain. The UE can request access to the same slice in the Wi-Fi domain and the Wi-Fi network can apply appropriate radio/network configurations for that session (e.g., association) in order to provide the services offered by that slice. Further, a client application on the UE can bind to the slice, and the Wi-Fi network can ensure its traffic gets the corresponding treatment both in the RAN and in the core network. As such, the Wi-Fi network can mirror the same performance as the 5G slice.

FIG. 1 illustrates a Wi-Fi network 100 that supports 5G slices, according to one embodiment. In one embodiment, the Wi-Fi network 100 includes Wi-Fi slices that mirror 5G slices (e.g., P5G slices) to provide the same (or similar) functions and performance. For example, a UE 140 (e.g., a mobile phone, tablet, laptop, autonomous vehicle, robot, etc.) previously connected to the 5G network can switch over to Wi-Fi network 100 and have access to a slice that supports the slicing constructs as the 5G network to provide a consistent network treatment regardless whether the UE 140 is connected to the 5G network or the Wi-Fi network 100.

The Wi-Fi network 100 includes a wireless local access network (LAN) controller (WLC) 105 (which can be a separate computing device or part of network device such as a switch, access point, or in the cloud) and an access point (AP) 135. The WLC 105 includes a slice manager 110 (e.g., a software application, hardware, firmware, or combinations thereof) that establishes and manages Wi-Fi slices in the network 100. For example, a system administrator may determine which Wi-Fi slices should be supported in the network 100 and instruct the slice manager 110 to establish these slices.

In this embodiment, the slice manager 110 uses templates 115 to establish the Wi-Fi slices. In one embodiment, each of the templates 115 corresponds to a different type of slice. For example, the network may support both standard slices, such as eMBB, URLLC, mIOT, and V2X, as well as custom slices (e.g., vendor specific slices). The templates 115 can include configuration information that the slice manager 110 uses to configure the network 100 to support the particular slice.

FIG. 1 illustrates an example template 115A of the templates 115. The template 115A can define a particular slice (whether a standard slice or a custom slice). As shown, the template 115A includes a slice definition 120, a 5G configuration 125, and a Wi-Fi configuration 130. The slice definition 120 describes the particular slice corresponding to the template 115A. The slice definition 120 can also describe the group of devices that should use (or are permitted to use) the slice. Further, the slice definition 120 can describe general information about the slice such as its features and attributes (e.g., low power or high bandwidth).

The 5G configuration 125 provides a first set of parameters that a 5G network can use to establish the slice. That is, the 5G configuration 125 provides the information that a 5G network controller can use to configure its network devices to support the slice.

The Wi-Fi configuration 130 provides a second set of parameters that the slice manager 110 can use to establish the slice in the Wi-Fi network 100. That is, the Wi-Fi configuration 130 provides the information that the slice manager 110 can use to configure the WLC 105 and the AP 135 to support the slice.

For example, if the template 115A corresponds to a MMTC slice, the slice definition 120 may indicate this slice supports very low bit rate, battery operated IoT devices. The Wi-Fi configuration 130 can then include parameters for establishing a Wi-Fi MMTC slice. In one embodiment, the Wi-Fi configuration 130 indicates that the slice manager 110 should partition the total bandwidth into two virtual channels of 20 MHz, plus any remaining bandwidth. This 20 MHz channel allows the AP 135 to schedule a plurality of devices (e.g., eight) at a time and/or by maximizing the use of the target wake time (TWT) feature, many IoT devices can be supported. The parameters in the Wi-Fi configuration 130 can further indicate that multi-user request to send (MU-RTS) and clear to send (CTS) frames are exchanged only on this 20 MHz channel for these UEs. Further, resource units (RUs) for individual IoT devices can be allocated on the 20 MHz partition. In one embodiment, the Wi-Fi configuration 130 indicates that each IoT device is allocated with one RU26 (2 MHz), which is sufficient to transfer sensor data or a command. The Wi-Fi configuration 130 can indicate that TWT cycle and buffer status report (BSR) polling is assigned in such a way that it aligns with sensors reporting period. In addition, the Wi-Fi configuration 130 can indicate that the AP should schedule transmission opportunities (TXOPs) at lower modulation coding scheme (MCS) so that maximum distance can be covered with higher reliability. In another embodiment, the AP the allocation of RUs to IoT devices is more dynamic and fluid than as described above, but still preserves the property that the IoT is granted resources sufficient to transfer sensor data or a command and the property the granted resources are assigned to align with the sensors' reporting period.

If the template 115A corresponds to a URLLC slice, the slice definition 120 may indicate this slice supports deterministic scheduling, low latency, and high reliability. The Wi-Fi configuration 130 can then include parameters for establishing a Wi-Fi URLLC slice. In one embodiment, the Wi-Fi configuration 130 indicates that Wi-Fi network adds client to the time sensitive scheduling to achieve the bounded latency configured for the service. In one embodiment, the Wi-Fi configuration 130 indicates that the sleep mode for the client device is modified by a TWT agreement, so that the client device is always periodically active and able to respond quickly. Further, reliability can be improved by scheduling at a conservative code rate (e.g., MCS), switching to diversity mode over multi-input multi-output (MIMO), setting up hybrid automatic repeat request (HARQ) for the link (for generations of Wi-Fi that support HARQ), in addition to media access control acknowledgment (MAC-ACK). In one embodiment, the Wi-Fi configuration 130 includes parameters indicating that a Multi-Link capability should be used if the client supports MLD, to duplicate or retry traffic across multiple links. If MLD capability is not allowed or available, Multi RU capability can be used to send duplicate or retried MPDUs over subsequent and, optionally, different RUs by utilizing time and frequency diversity.

If the template 115A corresponds to an eMBB slice, the slice definition 120 may indicate this slice supports typical voice, video, data transfer, and web browsing and that normal quality of service (QoS) scheduling is applied. The Wi-Fi configuration 130 can then include parameters for establishing a Wi-Fi eMBB slice. In one embodiment, the Wi-Fi configuration 130 indicates that another MU-RTS spanning across the full bandwidth is transmitted to indicate allocation for the client on the remaining bandwidth. In another example, the Wi-Fi configuration 130 indicates that a preamble puncturing mechanism (e.g., dynamic preamble puncturing) should be employed to schedule resources on bandwidth reserved for IoT devices and clients using the eMBB slice. In another embodiment, the slice is assigned as a portion of the resources such as a dynamic subset of the available RUs, where the mapping from slice to RU is implicitly or explicitly signaled within the Trigger frame (for uplink traffic) or fields in a PPDU such as preamble fields (for downlink traffic). Implicit signaling may be by listing the association ID (AID) of a device with access to the slice and/or preferred AC. Explicit signaling may be by listing a slice identifier.

Figure 2:
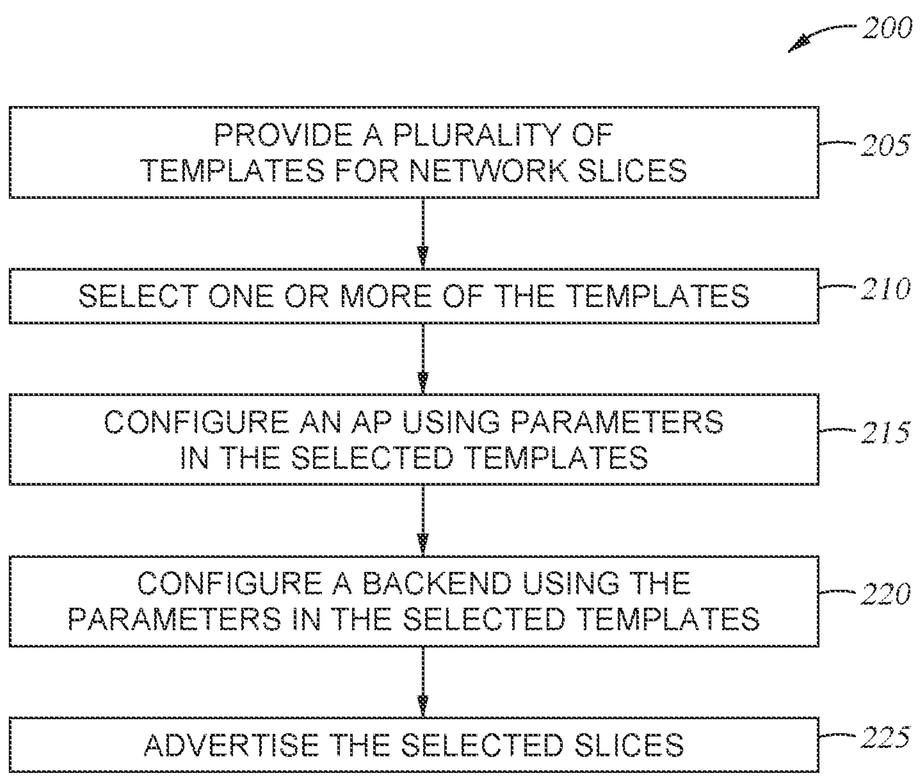
FIG. 2 is a flowchart for configuring a Wi-Fi network to support 5G slices using templates, according to one embodiment.

FIG. 2 is a flowchart of a method 200 for configuring a Wi-Fi network to support 5G slices using templates, according to one embodiment. At block 205, a system administrator or a template repository provides a plurality of templates for network slices. In one embodiment, each of the templates corresponds to one type of slice, whether that is a standard 5G slice or a custom slice. For example, the slices may be managed by common enterprise policy system that controls the policies for a Wi-Fi network and a 5G network (e.g., a P5G network). In one embodiment, the enterprise policy system comprises a domain name system (DNS) that manages the templates. In one example, the templates are accessible in the DNS using a uniform resource identifier (URI) that embeds the slice prefix. In another embodiment, the templates are stored and managed in an authentication, authorization, and accounting (AAA) server (e.g., a RADIUS server) that stores enterprise policies.

In one embodiment, each of the slice templates includes a first set of parameters for a cellular network configuration (e.g., 5G) and a second set of parameters for a Wi-Fi configuration. The first set of parameters for the cellular configuration (e.g., the 5G configuration 125 in FIG. 1) provides the parameters that a cellular network in the enterprise can use to establish the slice. That is, the first set of parameters provides the information that a 5G network controller can use to configure its network devices to support the slice. The second set of parameters for the Wi-Fi configuration (e.g., the configuration 130 in FIG. 1) provides the parameters that the Wi-Fi network can use to establish the slice in the Wi-Fi network. That is, the second set of parameters provides the information that a slice manager can use to configure a WLC and APs to support the slice. The Wi-Fi configuration can also configure a core network and a backend in the Wi-Fi network to support the slice.

In one embodiment, each of the slice templates also includes a slice definition which describes the particular slice corresponding to the template such as general information about the slice and its features. The slice definition may also describe the group of devices that should use (or are permitted to use) the slice. These groups can be used by an AP to determine which UEs are permitted to use the slice, which is described in more detail in FIGS. 3 and 4.

At block 210, the system administrator or the enterprise policy system selects one or more of the templates to use to establish the corresponding slice (or slices) on the Wi-Fi network. For example, the enterprise policy system may establish only a subset of the slices defined in the slice templates on the Wi-Fi network. In that case, the Wi-Fi network may not support as many slices as the 5G network. For example, the Wi-Fi network may not have the capabilities to support all of the 5G network slices, or the particular type of UEs that will access the Wi-Fi network will never use a particular slice. Thus, in some implementations, the 5G network and the Wi-Fi network may not support the same number of slices. However, in other implementations, the 5G network and the Wi-Fi network may support the same slices. For example, every slice that is supported by a P5G network may also be supported by the Wi-Fi network, or vice versa.

At block 215, a slice manager configures an AP using parameters in the selected templates. For example, a slice manager can identify the Wi-Fi configurations in each of the slice templates selected at block 210 and then configure the WLC and APs, and core network devices in the Wi-Fi network using the parameters in the Wi-Fi configurations. Examples of the various parameters that can be set by the slice manager were discussed above.

Although not discussed in method 200, in parallel, or at different times, a 5G controller can access the 5G configurations in the templates to configure the 5G network to provide the slices.

At block 220, the slice manager configures a backend of the Wi-Fi network using the parameters in the selected templates. That is, the slice manager can configure an AP backhaul to the WLC to provide backend control for the network slices using the parameters. As an example, for a URCLL slice, the slice manager may configure the backend of the Wi-Fi network to transmit a frame on two paths to an application server.

At block 225, the APs in the Wi-Fi network advertise the selected slices. The network can advertise the supported slices on a basic service set identifier (BSSID), and the client can request a given slice. Techniques used by an AP and a UE to request a slice are discussed in FIGS. 3 and 4. Further, the AP can use beacon messages, probe response messages, association requests and responses, and action frames, including the Access Network Query Protocol (ANQP) protocol to advertise the slices that are supported by the Wi-Fi network. Moreover, in one embodiment, the APs advertise the slices before the UEs have associated with the APs and the advertisement continues as UEs associate.

Figure 3:
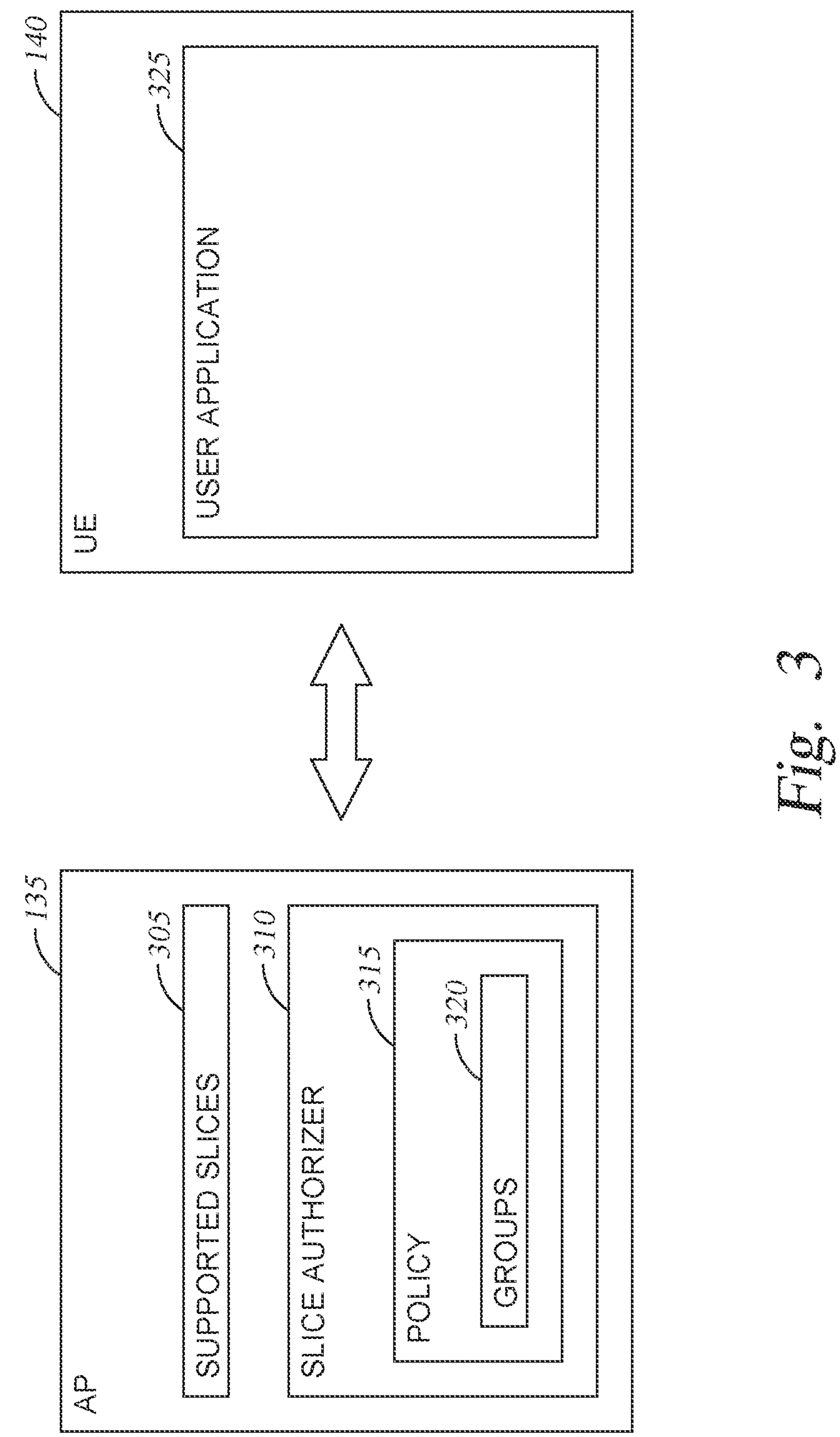
FIG. 3 illustrates a system for authorizing a UE to use a Wi-Fi slice, according to one embodiment.

FIG. 3 illustrates a Wi-Fi system 300 for authorizing a UE 140 to use a Wi-Fi slice, according to one embodiment. As shown, the AP 135 wirelessly communicates with the UE 140. The AP 135 includes a list of supported slices 305 that can be established or configured using the method 200 in FIG. 2. The AP 135 can then advertise these slices 305 to the UE 140. This can occur before the EU 140 has connected to (i.e., associated with) the AP 135.

The AP 135 also includes a slice authorizer (e.g., software or firmware) that determines whether a UE 140 can use one of the supported slices 305. That is, the enterprise policy system may want only certain types (or groups) of UEs to access a particular slice. If a different type of UE requests to use the slice, the slice authorizer 310 can deny the request.

In one embodiment, the actions of the slice authorizer 310 are determined by a policy 315. The policy 315 can indicate which groups 320 of UEs are permitted to use the slices 305, and which are not. The policy 315 can be provided to each of the APs in the Wi-Fi network by the enterprise policy system. While the embodiments herein discuss using a group or type of the UEs to determine whether the UEs are authorized to use a slice, these are just some example parameters that can be used. Further, in other embodiments, the APs may not have any policy 315 for governing access to the slices 305, in which case, any UE can use any of the supported slices 305 without going through an authorization process.

The UE 140 includes a user application 325 (e.g., a software application) that can be bound to one of the slices. That is, after the UE 140 associates with the AP 135 and is authorized to use one of the slices 305, the UE 140 can bind the user application 325 to that slice so that the Wi-Fi system provides the same service constructs to the user application 325 as in a 5G system.

Figure 4:
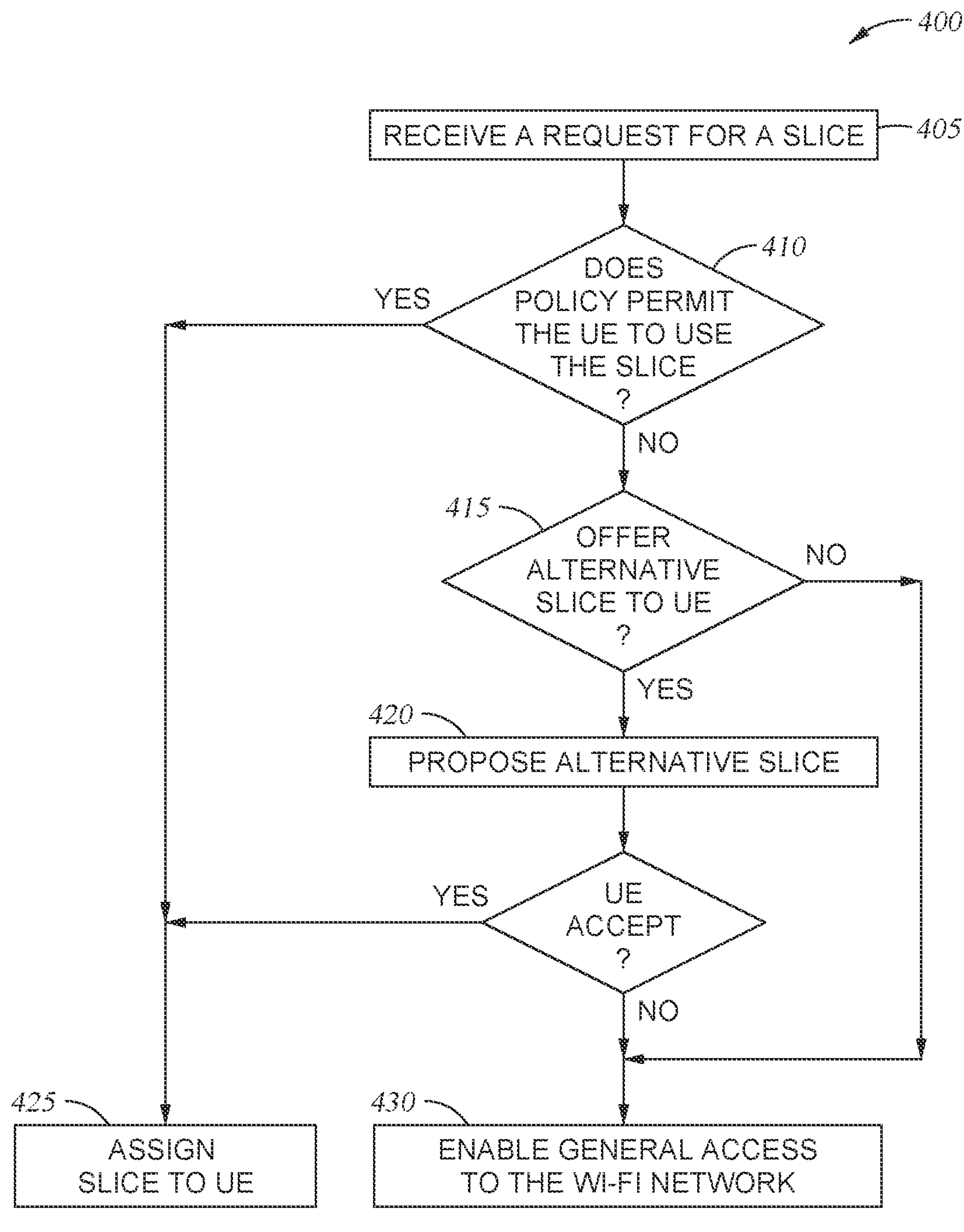
FIG. 4 is a flowchart for authorizing a UE to use a Wi-Fi slice, according to one embodiment.

FIG. 4 is a flowchart of a method 400 for authorizing a UE to use a Wi-Fi slice, according to one embodiment. At block 405, the AP request a request for a slice from a UE. In one embodiment, block 405 is performed at block 225 in FIG. 2 where the AP advertises the supported slices to the UE. In response, the UE can provide a hint to the AP about what slice the UE (or the user application executing on the UE) wants to use. In one embodiment, the hint indicates a particular slice type (e.g., eMBB, URLLC, mIOT, V2X, or a custom slice).

At block 410, the slice authorizer on the AP determines whether a policy (e.g., the policy 315 in FIG. 3) permits the UE to use the slice. In one embodiment, the AP determines the type or group of the UE, and whether the policy permits that type of UE or that group of UEs to use the requested slice. However, this is just one example technique that can be used to authorize a UE to use a slice.

If the policy permits the UE to use the requested slice, the method 400 proceeds to block 415 where the AP assigns the slice to the UE. That is, after completing the association process, the AP (and the rest of the devices in the Wi-Fi network) provide the services and features of that slice to the UE. When doing so, the slice manager may further configure the Wi-Fi network to ensure the UE has access to the services and features of that slice. That is, Wi-Fi network can apply the set of parameters corresponding to the selected network slice to network traffic associated with the UE.

However, if the slice authorizer determines the UE is not permitted to use the requested slice, the method 400 instead proceeds to block 415 where the AP determines whether it should offer an alternative slice to the UE. For example, the UE may request a slice that it is not authorized to use, or may request a slice that is not supported by the AP (if the AP does not advertise the slices). The policy on the AP may indicate alternative slices that a non-authorized UE can use. For example, the policy may indicate that Slice A can be used only by UEs of Type A, but if a UE of type B requests to use the Slice A, the AP should deny the request by offer the UE to use Slice B instead, which offers some of the same features as Slice A. Or the UE may want to use a slice that is not supported by the Wi-Fi network, but the Wi-Fi system may support a “light-weight” version of that slice. The policy can indicate when a device requests that slice, the AP should instead offer the light-weight version of the slice to the UE.

If the policy instructs the AP to offer (or recommend) an alternative slice to the UE, the method proceeds to block 420 where the AP proposes the alternative slice to the UE.

If, at block 425, the UE accepts the slice, the method 400 proceeds to block 415 where the AP assigns the alternative slice to the UE. However, if the UE does not accept the alternative slice, the method 400 proceeds to block 430 where the AP enables general access to the Wi-Fi network for the UE. In that case, the UE may not use a slice when accessing the Wi-Fi network. Or the Wi-Fi network may have a default slice that is used when the AP and the UE cannot agree on a slice.

Figure 5:
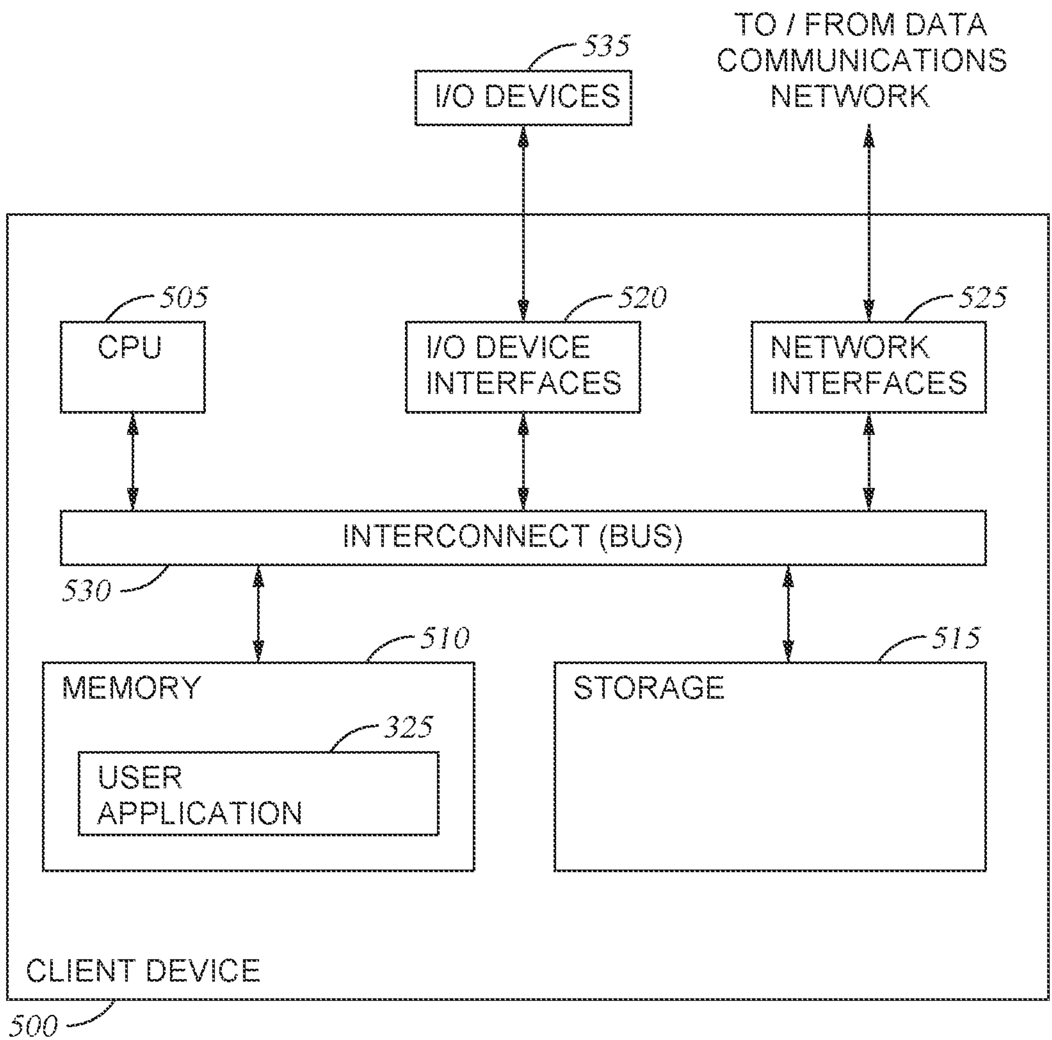
FIG. 5 depicts an example computing device configured to perform various aspects of the present disclosure, according to some embodiments of the present disclosure.

FIG. 5 depicts an example computing device (e.g., a UE) configured to perform various aspects of the present disclosure, according to some embodiments of the present disclosure. In some embodiments, the client device 500 corresponds to a UE 140 of FIG. 1. Although depicted as a physical device, in embodiments, the client device 500 may be implemented using virtual device(s), and/or across a number of devices (e.g., in a cloud environment).

As illustrated, the client device 500 includes a CPU 505, memory 510, storage 515, a network interface 525, and one or more I/O interfaces 520. In the illustrated embodiment, the CPU 505 retrieves and executes programming instructions stored in memory 510, as well as stores and retrieves application data residing in storage 515. The CPU 505 is generally representative of a single CPU and/or GPU, multiple CPUs and/or GPUs, a single CPU and/or GPU having multiple processing cores, and the like. The memory 510 is generally included to be representative of a random access memory. Storage 515 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 535 (such as keyboards, monitors, etc.) are connected via the I/O interface(s) 520. Further, via the network interface 525, the client device 500 can be communicatively coupled with one or more other devices and components (e.g., via a network, which may include the Internet, local network(s), and the like). As illustrated, the CPU 505, memory 510, storage 515, network interface(s) 525, and I/O interface(s) 520 are communicatively coupled by one or more buses 530.

In the illustrated embodiment, the memory 510 includes the user application 325, which may perform one or more embodiments discussed above. Although depicted as discrete components for conceptual clarity, in embodiments, the operations of the depicted components (and others not illustrated) may be combined or distributed across any number of components. Further, although depicted as software residing in memory 510, in embodiments, the operations of the depicted components (and others not illustrated) may be implemented using hardware, software, or a combination of hardware and software.

Figure 6:
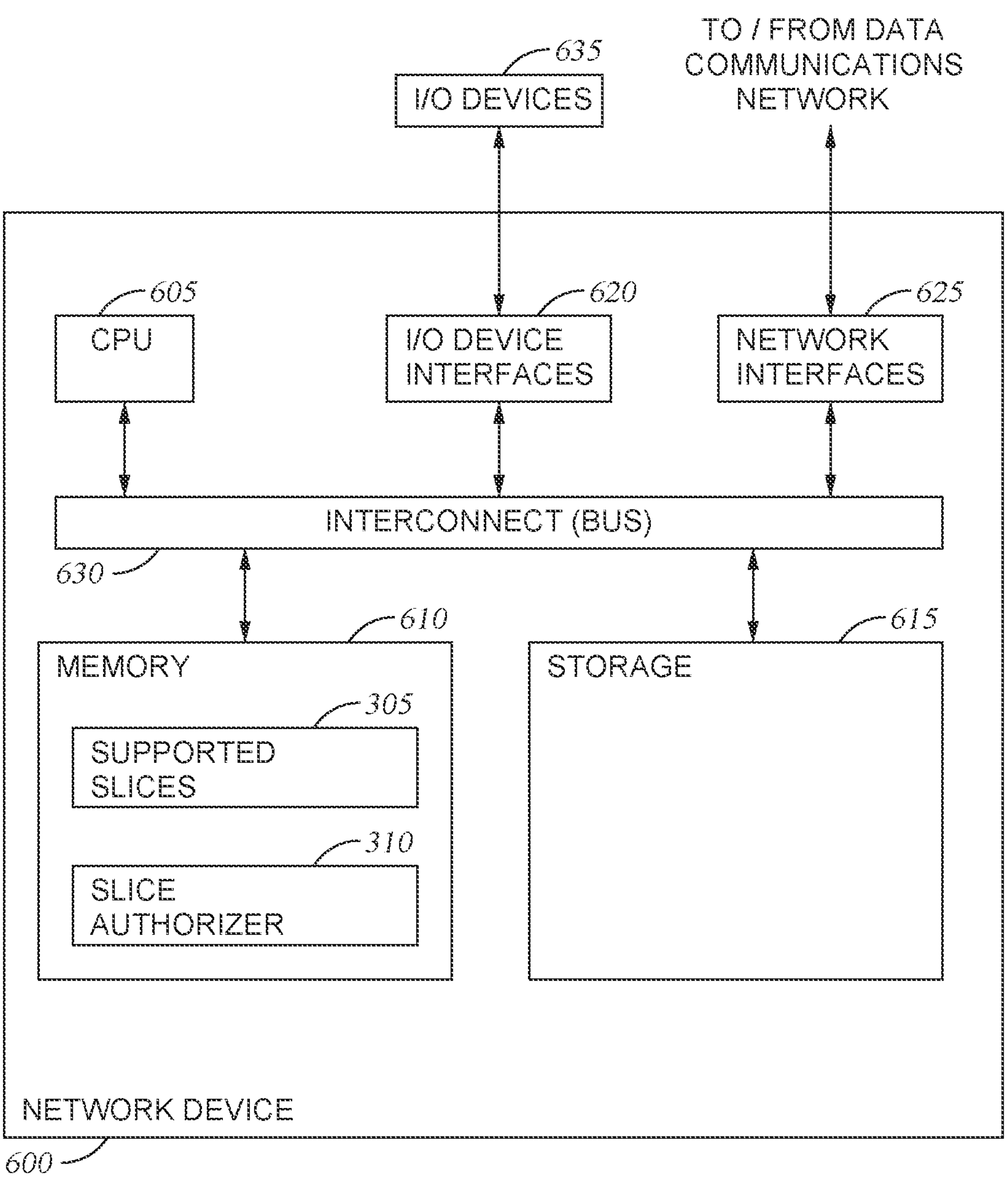
FIG. 6 depicts an example computing device configured to perform various aspects of the present disclosure, according to some embodiments of the present disclosure.

FIG. 6 depicts an example computing device (e.g., a network device 600) configured to perform various aspects of the present disclosure, according to some embodiments of the present disclosure. In some embodiments, the network device 600 corresponds to an AP 135 or WLC 105 of FIG. 1. Although depicted as a physical device, in embodiments, the network device 600 may be implemented using virtual device(s), and/or across a number of devices (e.g., in a cloud environment).

As illustrated, the network device 600 includes a CPU 605, memory 610, storage 615, a network interface 625, and one or more I/O interfaces 620. In the illustrated embodiment, the CPU 605 retrieves and executes programming instructions stored in memory 610, as well as stores and retrieves application data residing in storage 615. The CPU 605 is generally representative of a single CPU and/or GPU, multiple CPUs and/or GPUs, a single CPU and/or GPU having multiple processing cores, and the like. The memory 610 is generally included to be representative of a random access memory. Storage 615 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 635 (such as keyboards, monitors, etc.) are connected via the I/O interface(s) 620. Further, via the network interface 625, the network device 600 can be communicatively coupled with one or more other devices and components (e.g., via a network, which may include the Internet, local network(s), and the like). As illustrated, the CPU 605, memory 610, storage 615, network interface(s) 625, and I/O interface(s) 620 are communicatively coupled by one or more buses 630.

In the illustrated embodiment, the memory 610 includes the supported slices 305 and slice authorizer 310, which may perform one or more embodiments discussed above. Although depicted as discrete components for conceptual clarity, in embodiments, the operations of the depicted components (and others not illustrated) may be combined or distributed across any number of components. Further, although depicted as software residing in memory 610, in embodiments, the operations of the depicted components (and others not illustrated) may be implemented using hardware, software, or a combination of hardware and software.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:

providing, by a wireless local access network (LAN) controller (WLC), a plurality of templates for a plurality of different types of network slices, wherein each of the plurality of templates includes a first set of parameters for establishing a respective slice in a cellular network, a second set of parameters for establishing the respective slice in a Wi-Fi network, and a slice definition indicating a group of client devices that should use or are permitted to use the respective slice; and configuring, by the WLC, an access point (AP) to support the second set of parameters in the plurality of templates; and advertising the network slices to client devices using the AP.

2. The method of claim 1, wherein the AP advertises the network slices to the client devices before the client devices have associated with the AP.

3. The method of claim 1, further comprising:

receiving a selection of one of the network slices from a first client device; and after authorizing the first client device to use the selected network slice, applying the second set of parameters corresponding to the selected network slice to network traffic associated with the first client device, wherein the second set of parameters alters at least one radio configuration of the AP.

4. The method of claim 3, wherein authorizing the first client device to use the selected network slice comprises:

providing a policy indicating a group of devices that are authorized to use the selected network slice, based on the slice definition of the selected network slice; and determining that the first client device is part of the group of devices.

5. The method of claim 4, wherein the policy indicates a different network slice that the AP should recommend if a second client device requests to use the selected network slice, but is not part of the group of devices.

6. The method of claim 1, further comprising:

managing the first and second sets of parameters and the slice definition in the plurality of templates using an enterprise policy system that includes the cellular network and the Wi-Fi network.

7. The method of claim 6, wherein the enterprise policy system comprises a domain name system (DNS) for managing the plurality of templates.

8. The method of claim 1, wherein the second set of parameters affect communication between the AP and the WLC to provide backend control for the network slices.

9. A system, comprising:

an access point (AP); and a wireless local access network (LAN) controller (WLC) configured to:

provide a plurality of templates for a plurality of different types of network slices, wherein each of the plurality of templates includes a first set of parameters for establishing a respective slice in a cellular network, a second set of parameters for establishing the respective slice in a Wi-Fi network, and a slice definition indicating a group of client devices that should use or are permitted to use the respective slice, and configure the AP to support the second set of parameters in the plurality of templates, wherein the AP is configured to advertise the network slices to client devices.

10. The system of claim 9, wherein the AP is configured to advertise the network slices to the client devices before the client devices have associated with the AP.

11. The system of claim 9, wherein the AP is configured to:

receive a selection of one of the network slices from a first client device; and after authorizing the first client device to use the selected network slice, apply the second set of parameters corresponding to the selected network slice to network traffic associated with the first client device, wherein the second set of parameters alters at least one radio configuration of the AP.

12. The system of claim 11, wherein authorizing the first client device to use the selected network slice comprises:

providing a policy indicating a group of devices that are authorized to use the selected network slice, based on the slice definition of the selected network slice; and determining that the first client device is part of the group of devices.

13. The system of claim 12, wherein the policy indicates a different network slice that the AP should recommend if a second client device requests to use the selected network slice, but is not part of the group of devices.

14. The system of claim 9, wherein the WLC is further configured to manage the first and second sets of parameters and the slice definition in the plurality of templates using an enterprise policy system that includes the cellular network and the Wi-Fi network.

15. The system of claim 14, wherein the enterprise policy system comprises a domain name system (DNS) for managing the plurality of templates.

16. The system of claim 9, wherein the second set of parameters affect communication between the AP and the WLC to provide backend control for the network slices.

17. A wireless local access network (LAN) controller (WLC), comprising:

a processor; and a memory storing a program which, when executed by the processor, performs an operation, the operation comprising:

providing a plurality of templates for a plurality of different types of network slices, wherein each of the plurality of templates includes a first set of parameters for establishing a respective slice in a cellular network, a second set of parameters for establishing the respective slice in a Wi-Fi network, and a slice definition indicating a group of client devices that should use or are permitted to use the respective slice; and configuring an access point (AP) to support the second set of parameters in the plurality of templates, wherein the AP is configured to advertise the network slices to client devices.

18. The WLC of claim 17, wherein the WLC receives the plurality of templates from an enterprise policy system that controls policies for the Wi-Fi network and the cellular network regarding access to the network slices.

19. The WLC of claim 18, wherein the enterprise policy system comprises a DNS that manages the plurality of templates.

20. The WLC of claim 17, wherein the second set of parameters alters at least one radio configuration of the AP.

* * * * *